June 6, 1961 F. E. BONNER ET AL 2,987,714
SPEED SIGNAL DEVICE OPERATED FROM OIL PRESSURE LINE
Filed Sept. 30, 1957 2 Sheets-Sheet 1
FIG-1
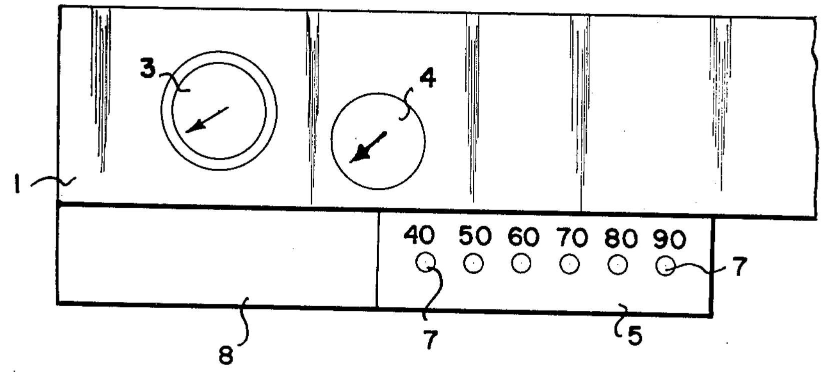
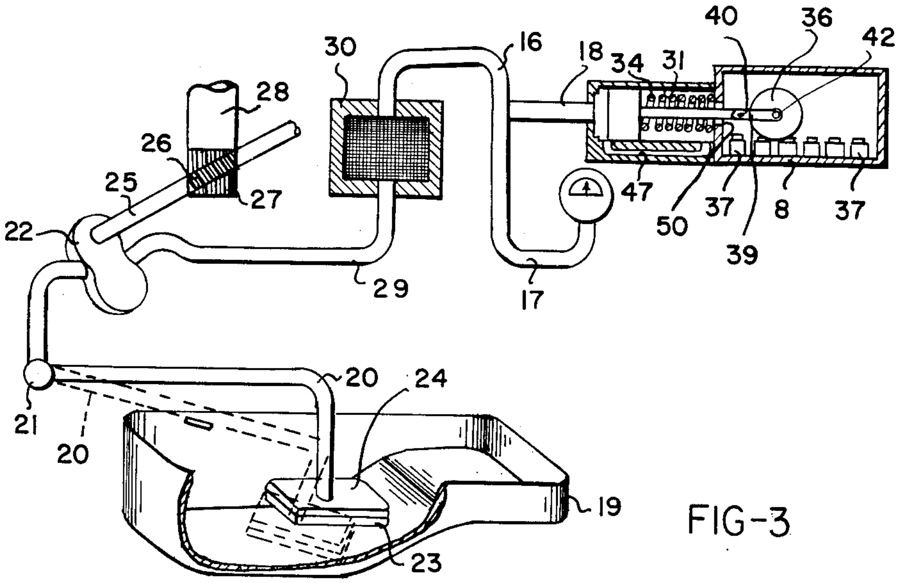
FIG-3
FIG-2
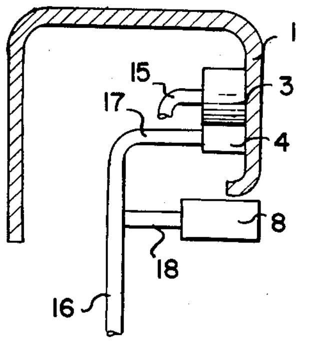
INVENTORS
FRANK E. BONNER
RAYMOND L. RUSE
BY Toulmin & Toulmin
ATTORNEYS FIG-4
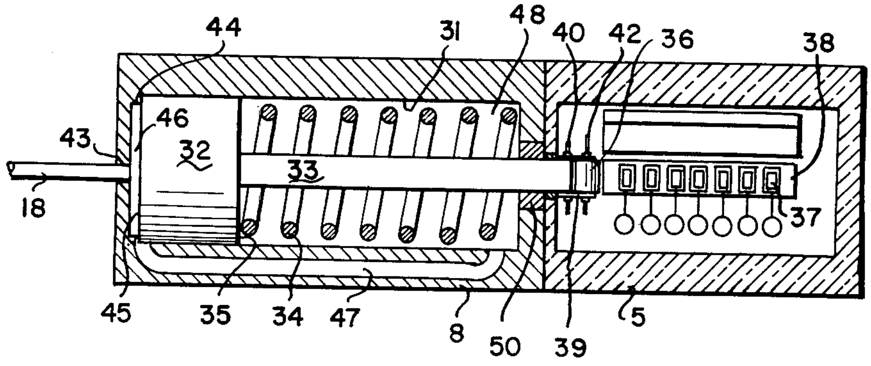
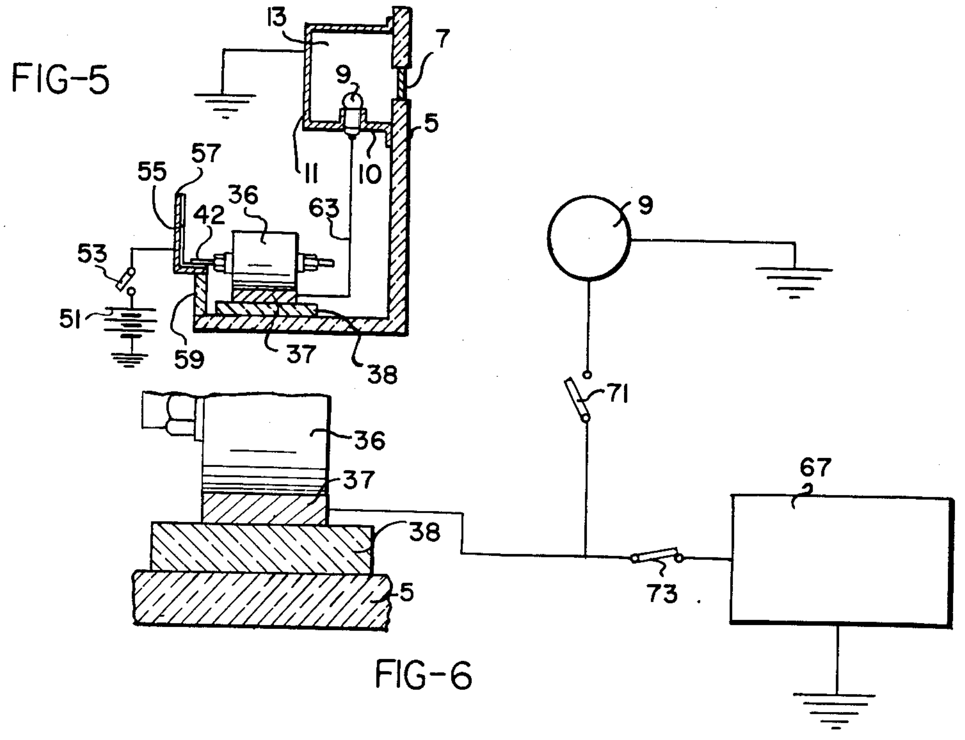
FIG-5, FIG-6
INVENTORS
FRANK E. BONNER
RAYMOND L. RUSE
BY Toulmin & Toulmin
ATTORNEYS
June 6, 1961
F. E. BONNER ET AL
2,987,714
SPEED SIGNAL DEVICE OPERATED FROM OIL PRESSURE LINE
Filed Sept. 30, 1957
2 Sheets-Sheet 2
*INVENTORS*
ATTORNEYS United States Patent Office 2,987,714

Patented June 6, 1961

2,987,714

SPEED SIGNAL DEVICE OPERATED FROM OIL PRESSURE LINE

Frank E. Bonner and Raymond L. Ruse, Dayton, Ohio, assignors to The Commonwealth Engineering Company of Ohio, Dayton, Ohio, a corporation of Ohio Filed Sept. 30, 1957, Ser. No. 687,234
2 Claims. (Cl. 340—263)

This present invention relates to speed indicating devices, and more particularly to speed warning mechanisms for automobiles.

In the usual automotive speedometers there is provided a dial which is calibrated in miles per hour; a pointer sweeps over the dial in the operation of the vehicle to indicate the speed of the vehicle. It is particularly desirable, however, to bring more positively to the attention of the driver of a vehicle the speed at which he is traveling, especially so when the speed becomes excessive.

An important object of the present invention is to provide a speed warning system which is operated through oil pressure built up as the engine speed increases. Accordingly, in the preferred embodiment of the invention the speed indicator or warning system is actuated through the pressure of the usual lubricating system of the vehicle. Such lubricating systems generally include a pump driven from the cam shaft of the vehicle and the pressure in the system reflects the vehicle speed.

While any suitable driving mechanism may be employed to develop the pressure reflective of the vehicle speed, the utilization of components already provided on the vehicle is desirable for reasons of economy and simplicity.

A further object of the invention is to provide a speed warning system which is composed of but a few simple parts, which is positive and accurate in operation, of relatively small size and weight, and which is conveniently adaptable for installation in substantially any automotive vehicle.

These and other allied objects of the invention will become more apparent from reference to the following detailed description and accompanying drawings wherein:

FIGURE 1 is a fragmentary front elevational view of an automobile dash-board having a speed warning system of this invention mounted in conjunction therewith;

FIGURE 2 is a side elevational view of the structure of FIGURE 1;

FIGURE 3 is a schematic view illustrating the main operating components of the structure of invention and their association and relationship with the usual components of a vehicle;

FIGURE 4 is a plan view of a portion of the structure of FIGURE 3 and illustrates novel mechanism which is adapted to be included in the lubricating system of an automobile for deriving a speed indication therefrom;

FIGURE 5 is a view partially in section illustrating the relationship of visual indicating means with associated electrical circuitry; and FIGURE 6 schematically illustrates one embodiment of the invention adapted for sound and/or visual indication.

In the operation of the speed warning system of this invention the warning system mechanism is operably associated with the lubrication system of the vehicle and the pressure in that system is utilized to actuate the speed warning system mechanism.

Referring to the drawings more particularly, the numeral 1 in FIGURE 1 indicates a fragment of the dashboard of an automobile having the usual speed indicating dial 3 and oil pressure gauge 4. Below the dashboard 1 there is mounted a casing 5, which is suitably of plastic or other insulating material. Casing 5 is provided with a plurality of apertures 7 which are arranged to be visually inspected conveniently by the operator of the vehicle.

As indicated in FIGURE 1 a housing 8 is provided in association with the casing 5. Behind each aperture 7 of the casing 5 (FIGURE 5) there is a light bulb 9 which is mounted in a bayonet type base 10 in a metallic frame 11. A plurality of the lights 9 are each separated from each other by a plurality of vertically extending panels 13 of the frame 11; these panels 13 prevent the passage of light between compartments housing the light bulbs.

Referring again to FIGURE 1, it will be noted that over each aperture numerals are provided to indicate the speed at which each bulb 9 lights, and as shown in the drawing these numerals increase in value progressively from left to right and are designed to indicate speed between 40 and 90 miles per hour.

Referring to Figure 2, the numeral 15 designates the usual flexible cable which is secured to the speedometer 3 for actuation of the same. A main oil pressure conduit 16 is provided with a conduit portion 17 which connects in any suitable manner to the oil gauge 4. A branch connection 18 to the conduit 16 is connected into the housing 8.

Referring now to Figure 3, there is schematically illustrated therein the relationship of the housing 8 to the usual operating components of the vehicle. The numeral 19 indicates an oil pan from which conduit 20 extends upwardly to a pivot 21, the pivot being connected to oil pump 22 for the flow of oil from the pan to the pump.

The numeral 23 in FIGURE 3 designates the usual float oil screen having an air-tight compartment at 24; such latter components form no part of the present invention, but are illustrated for the sake of completeness.

Oil pump 22 is driven through shaft 25 from gears at 26, 27, the latter of which is mounted on cam shaft 28 of the vehicle. Oil flowing under the pressure developed by pump 22 through the conduit 29 passes to oil filter 30 and then through conduit 16 to the conduit portions 17, 18.

Housing 8 is provided with a cylindrical inner wall 31 (FIGURE 4) and encloses a piston 32 having a piston rod 33. The piston rod is surrounded by a coil compression spring 34 which abuts at one end against the face 35 of the piston 32 and at the other end against the interior wall of the housing.

The piston rod 33 projects outwardly of the housing in sealed relationship with the housing and carries at its outer end a rotatable contact element 36. Contact element 36 is adapted to successively engage spaced contacts 37 mounted in the casing 5 on an insulating block 38. The contact element 36 is provided in electrically insulated relation with the piston rod 33 by arms 39 of electrically insulating material, for example, Bakelite. The arms are supported in a pin 40 which extends through the piston rod 33 and on an electrically conductive shaft 42 which passes centrally through the rotatable contact element 36.

Referring to FIGURE 4 an inlet 43 is provided at the left hand side of the housing 8 and receives the conduit portion 18. Shoulder 44 of the inner cylindrical wall is arranged to abut and limit the leftward movement of the piston 32.

Face 45 which fronts on the spacing 46 of the housing receives the full pressure of oil flowing inwardly through the conduit 18. Spacing 46 is itself communicated by a passage 47 with spacing 48 which forms the right hand end of the cylinder in the housing 8.

When pressure is placed upon the face 45 the piston 32 will move rightwardly, movement being opposed by the spring 34 and the pressure of the oil in the spacing 48. However, due to the differential area between faces 45 and 35 on the piston 32, the piston 32 will be moved until the compression of the spring 34 is sufficient to compensate for the differential force exerted on face 45 and face 35. With such movement of the piston 32 the contact element 37 will of course be moved rightwardly in the arrangements of FIGURES 3 and 4. The numeral 50 designates a seal carried by the housing which prevents leakage of oil around the piston rod 33.

The contacts 37 may be of any desired spacing and may themselves be of any desired length for traverse by the roller 36. However, the contact should be of such length and so spaced that the roller 36, when it has once left its normal position (FIGURE 3), will always be in contact with one only of the contacts 37.

Referring now to FIGURE 5, the numeral 51 indicates a battery, one side of which is grounded and the other side of which is connected through a switch 53 to a longitudinally extending conductor 55 (FIGURE 4). The conductor 55 is suitably mounted on a block of insulating material 57, which is itself supported either from the casing 5 or from other insulating material as indicated at 59.

The roller 36 carries a shaft portion 42 which shaft portion is in contact with the conductor 55 to form an electrical connection between the conductor and the roller. Each of the contacts 37 is connected by a lead as at 63 at one side of the bulb 9, the other side of the bulb being grounded through the frame 11. Accordingly, when switch 53 is in closed position and the roller traverses the contacts lights will be successively illuminated as the roller traverses. The contacts 37 are themselves either supported directly from the casing 5 when the same is of insulating material, or from insulating block 38 beneath the contacts.

As indicated schematically in FIGURE 6 a sound system designated by the numeral 67 may be placed in parallel with the bulb 9. Switch 71 may be placed in series with the bulbs 9. Also, a switch 73 may be placed in series with the sound system. These switches 71 and 73 permit utilization of either system, or both systems, as desired.

Summarizing, in the operation of the device of invention, the speed indicating mechanism comprised of the components of housing 8 and casing 5 is actuated through oil pressure derived from the operation of pump 22, which pump is itself driven through the usual running gear of the car, such as the cam shaft 28.

The pressure developed on the face 45 of the piston is balanced by the combination of the compression force exerted by the spring 34 and the fluid pressure on the face 35 of the piston. Compression of the spring 34 provides for the balancing and the positive positioning of the contact element 36. This limiting of the piston displacement provides for a true reflection of the pressure in the lubricating system, which system is itself governed by the speed of the vehicle, and results in the illumination of the appropriate light at 9.

The device is a compact unit, can be readily installed in substantially all modern vehicles for convenient reading by the operator of the vehicle.

As will be noted in the specific embodiment described it is only necessary to provide for a suitable connection between housing 8 and the oil pressure line of the vehicle.

It will be understood that this invention is susceptible to modification in order to adapt it to different usages and conditions and accordingly, it is desired to comprehend such modifications within this invention as may fall within the scope of the appended claims.

We claim:

1. In combination in a vehicle speed indicating system, which vehicle has a fluid pressure pump and a camshaft; a cylinder; a piston in the cylinder; a passage connecting the pump to a first end of the cylinder for imposing the fluid pressure of the pump on a face of the piston; a conduit connecting the pump to the other end of the cylinder for imposing fluid pressure of the pump on a second face of the piston; a piston rod projecting from the second face of the piston; a coil spring surrounding the piston rod, abutting the second face of the piston and also abutting a second end of the cylinder, said piston rod projecting outwardly of the cylinder; an electrical contact element on the outer end of said piston rod in electrically insulated relation therewith; a plurality of spaced electrically insulated contacts rectilineally arranged to be sequentially traversed by said contact element in the movement of said piston rod; means to energize said contact element electrically; indicating means connected with each of said contacts, said means being energizable electrically; and shaft means for connecting said pump to the camshaft of the vehicle.

2. In combination with a vehicle having a fluid pressure line, a pump for development of fluid pressure in the line and a camshaft connected to the pump for driving of the pump; housing means communicable with the fluid pressure line; a cylinder formed in the housing means; a piston in the cylinder; a passage in a first end of the housing means connecting the pump to a first end of the cylinder for imposing the fluid pressure of the pump on a face of the piston; a conduit within the housing means connecting the pump to the other end of the cylinder for imposing fluid pressure of the pump on a second face of the piston; a piston rod projecting from the second face of the piston; a coil spring surrounding the piston rod, abutting the second face of the piston and also abutting a second end of the housing means within the cylinder, said piston rod projecting outwardly of the housing means; an electrical contact element on the outer end of said piston rod in electrically insulated relation therewith; a plurality of spaced electrically insulated contacts rectilineally arranged to be sequentially traversed by said contact element in the movement said piston rod; means to energize said contact element electrically; indicating means connected with each of said contacts, said means being energizable electrically; and shaft means forming the connection between the camshaft and the pump.

References Cited in the file of this patent

UNITED STATES PATENTS

| | | |
|---|---|---|
| 2,058,553 | Beiderman | Oct. 27, 1936 |
| 2,523,600 | Moth | Sept. 26, 1950 |
| 2,856,472 | Humphries | Oct. 14, 1958 |
| 2,905,457 | Emerson | Sept. 22, 1959 |

FOREIGN PATENTS

| | | |
|---|---|---|
| 35,932 | Holland | July 15, 1935 |
| 400,095 | Italy | Nov. 24, 1942 |